United States Patent [19]

Chandezon et al.

[11] Patent Number: 6,129,129
[45] Date of Patent: Oct. 10, 2000

[54] RADIAL TIRE COMPRISING A CARCASS PLY WITH A NOTCHED LAP WELD

[75] Inventors: Pierre Chandezon; Jean Billieres, both of Clermont-Ferrand, France

[73] Assignee: Compagnie Generale des Etablissements Michelin - Michelin & Cie, Clermont-Ferrand Cedex, France

[21] Appl. No.: 09/142,211
[22] PCT Filed: Feb. 28, 1997
[86] PCT No.: PCT/EP97/00971
  § 371 Date: Sep. 3, 1998
  § 102(e) Date: Sep. 3, 1998
[87] PCT Pub. No.: WO97/32740
  PCT Pub. Date: Sep. 12, 1997

[30] Foreign Application Priority Data

Mar. 5, 1996 [FR] France .................................. 96 02866

[51] Int. Cl.[7] ................................................ B06C 9/02
[52] U.S. Cl. ........................... 152/548; 152/560; 156/134
[58] Field of Search .................................. 152/548, 558, 152/560; 156/134

[56] References Cited

U.S. PATENT DOCUMENTS 4,466,473  8/1984  Matyja et al. ........................... 156/134
5,658,405  8/1997  Iseki ........................................ 152/560

FOREIGN PATENT DOCUMENTS

| 0117137 | 8/1984 | European Pat. Off. . |
| 0120623 | 10/1984 | European Pat. Off. . |
| 0707984 | 4/1996 | European Pat. Off. . |
| 61-083025 | 4/1986 | Japan ................................. 152/548 |

OTHER PUBLICATIONS

Patent Abstracts of Japan, English Abstract for JP 61–083,025, Apr. 1986.

*Primary Examiner*—Geoffrey L. Knable
*Attorney, Agent, or Firm*—Baker Botts, LLP

[57] ABSTRACT

A radial tire (10) having at least one belt enforcement (13) and one carcass reinforcement (14) with at least one ply (20) of rubberized fabric (24) having radial threads (25) essentially parallel to the radial direction (xx'), the radial ply having at least one overlapping splice (21) formed by the overlapping of two edges (22, 23) of the said fabric (24) and being limited circumferentially by two borders (28,29), characterized in that the said splice (21), in each of the said edges (22, 23), has at least one cut (26, 27) located underneath the belt reinforcement (13) and splitting several radial threads (25). The tire according to the invention, compared with classical radial tires of the prior art, presents an external sidewall appearance that is clearly improved.

14 Claims, 3 Drawing Sheets

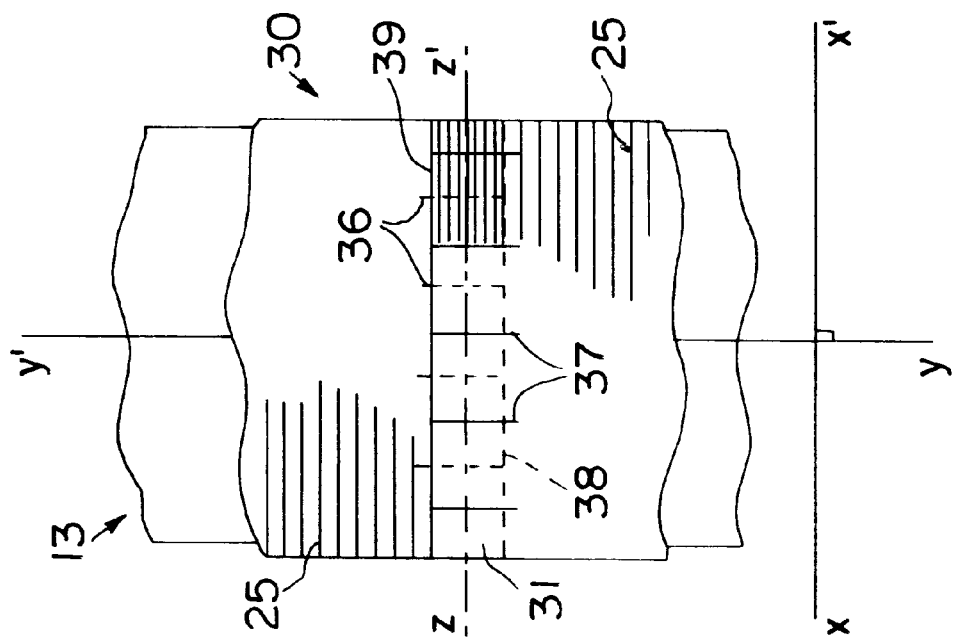
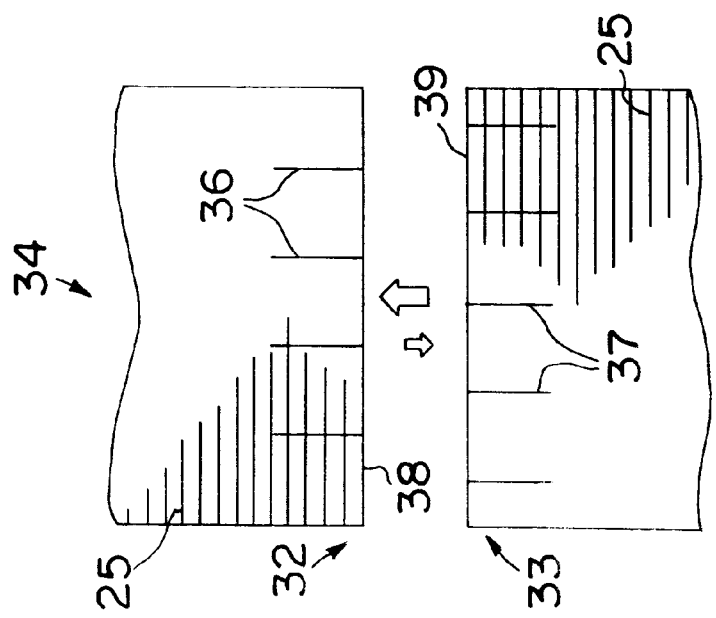
FIG. 3b
FIG. 3a

RADIAL TIRE COMPRISING A CARCASS PLY WITH A NOTCHED LAP WELD

BACKGROUND OF THE INVENTION

The present invention concerns radial tires and the reinforcement of the carcasses thereof.

It is known that such carcass reinforcement includes at least one layer of ply, hereinafter called a radial ply or radial carcass ply, prepared in the form of a semi-finished product of essentially an elastomeric matrix reinforced by crossthreads. These reinforcement threads, hereinafter called radial threads, are arranged parallel to one another and at regular intervals in an essentially radial direction, i.e., a direction making an angle of approximately 90°±10° with the tangent to the circumference of the tire.

Each radial ply normally takes the form of a continuous annular element formed during the fabrication of the carcass reinforcement on a drum by cutting widths or strips of rubberized tire fabric and then joining together the two edges of the fabric thus cut on the drum, by means of a joint also known as a weld splice, which enables those edges to be joined. The strips of tire fabric are usually cut between and parallel to two radial threads to avoid cutting them.

Two types of joints or splices are currently in use: the so-called butt splice obtained by abutment of the two edges without overlap, and the so-called overlapping splice, i.e., one involving overlap of the two edges. In the case of radial tire for touring vehicles whose carcass is reinforced with non-metallic threads, notably by textile threads, a overlapping splice is the more usual.

The present invention relates to an improvement to overlapping splices of the radial ply constituting the carcass reinforcement of radial tires.

As its name suggests, the overlapping splice technique involves covering one edge of the cut fabric with its other edge over a certain distance, and joining the two together by the application of pressure. After curing of the tire carcass, this type of splice shows great strength because of the considerable area of mutual adhesion between the overlapped portions.

However, this overlapping splice has disadvantages. Because of the double thickness of tire fabric, the density of the radial threads is in effect doubled in the overlap zone. The term "density of threads", is a term which denotes the number of threads per unit length of ply in a direction normal to the axis of the threads. Because of the presence of this double layer, and notably under the effect of the inflation pressure of the tire and therefore the tensioning of the radial carcass ply, each radial thread in the seam is stressed and elongated about half as much as a thread outside the overlapped zone. Moreover, and in a known way, if the radial threads are thermo-shrinking they will contract differently during the curing of the tire, depending on whether they are within or outside the overlap.

The above phenomena result in a discontinuity of the properties of the carcass ply in the region of the overlap, notably its rigidity, such that the tire produced is not uniform. This discontinuity and non-uniformity, which are very localized, may be particularly harmful for the appearance, the external aspect of the tire, because they will in general result in the formation of a more or less pronounced hollow in the sidewalls of the inflated tire. It is known that this depression or deformation of the sidewall, also described as an indentation, is the more marked the lower is the tensile modulus of the reinforcing thread used.

The above appearance defect, which is well known and particularly visible when using threads of polyester with a low tensile modulus, is sometimes prejudicial to the marketability of the tire. If the defect is deemed too pronounced, it may even prevent any sales of the manufactured tire, resulting in the eventual destruction thereof, a destruction all the more regrettable from the functional standpoint since the unattractive appearance is not associated with any compromise of safety at all. Moreover, it is known that this non-uniformity of the tire sidewalls can have an adverse effect on the rolling regularity of the tire.

Very many prior solutions have been proposed to attempt to overcome the above disadvantages.

Most of these solutions involve modifying the characteristics of the radial reinforcement threads, or their arrangement in the part of the overlap. Such solutions possess the major disadvantage of necessitating either the preparation of hybrid liner fabrics, i.e. nonhomogeneous ones (the use of natural radial threads with different properties, or the use of different thread densities in the overlapped zone) upstream of the tire fabrication operations themselves, or costly additional operations during the fabrication (removal of doubled threads, reduction of overlapping thickness by techniques involving the compression or uniformization of the overlap zone, addition of other strips of fabric or rubber, to name but a few known examples).

Other solutions, fewer in number, have been proposed that consist in selectively cutting some of the "doubled" radial threads in one or the other of the overlapping edges. Thus, only the threads in one of the two edges will "take part" in the tensioning of the carcass ply. These cuts generally consist of narrow incisions (without removal of material) or wide notches (with removal of material—the so-called "notching" technique) made in the fabrication fabrics, which are generally located at some point on the sidewall of the tire as far as the inside part of the bead (bead zone situated on the inside of the casing, or even under the bead ring, see for example the patents U.S. Pat. No. 4,466,473 or EP 0 117 137, and the patent applications published under numbers JP1986/83025, JP1986/94745, JP1986/218402).

In particular, U.S. Pat. No. 4,466,473 or the equivalent EP 0 117 137 describe a process for the fabrication of a radial carcass reinforcement which consists in making, in just one of the overlap edges, all along that edge and at regular intervals, a plurality of cuts perpendicular to the direction of the radial threads, of depth essentially the same as the overlap width, the said edge then being covered by the other edge to form the overlapping splice. By cutting the radial threads of one overlapping edge in this way, the tension is eliminated in the threads of that edge, while they are doubled in the threads of the other edge. Thus, the threads in the uncut edge support a stress essentially identical to that in the threads outside the overlapping zone, such that tension variations between the inside and the outside of the overlap are eliminated, the hollowing deformation is appreciably reduced, and the uniformity of the sidewall improved.

The above methods involving selective cutting of the radial threads, applied to just one of the two overlapping edges, whether in the sidewall or on the inside of the bead, are particularly delicate to carry out. On the one hand the cut must be deep enough to go through all the doubled threads, but on the other hand it is imperative, for safety reasons, that none of the threads outside the splice zone are cut in the sidewall or inside the bead zone, so that the radial continuity of the carcass reinforcement outside the overlap zone is entirely preserved. Such conditions entail frequent manual interventions or repetitions by an operator on the fabrication drum, and these methods have ultimately proved to be incompatible with the use of automatic fabrication machines operating at a high rate, which cannot guarantee the precision that is essential for the formation of such cuts and overlaps. These disadvantages, which are well known, are mentioned for example in patents or patent applications EP 0 239 160 or U.S. Pat. No. 4,810,317, EP 0 407 134 or U.S. Pat. No. 5,437,751.

In fact, the very many solutions proposed so far have proved costly or difficult to apply industrially, and none of them has been found completely satisfactory, notably from the standpoint of productivity, for suppressing or even reducing the problem of sidewall deformation in radial tires, especially those reinforced with polyester threads.

Thus, there is still a demand, indeed an increasing one, to improve the appearance of radial tire sidewalls.

SUMMARY OF THE INVENTION

One objective of the present invention is to propose a tire clearly improved in relation to the appearance and uniformity of its sidewalls, and this, without adverse effect on its other properties.

Another objective of the invention is to offer such a tire without fabrication difficulties or additional costs, which can be produced by automatic machines operating at high rate, without the need for manual interventions and thus without reduction of the productivity.

The radial tire of the invention comprises at least one belt reinforcement and one carcass reinforcement having at least one ply of rubberized fabric, which includes radial threads essentially parallel to the radial direction, the said radial ply comprising at least one splice formed by overlapping of two edges of the said fabric and limited circumferentially by two borders, and is characterized in that the said overlap comprises, in each of its two edges, at least one cut positioned underneath the belt reinforcement, which splits a plurality of radial threads.

In other words, the tire of the invention has a carcass reinforcement formed by at least one continuous annular element (radial ply) welded by the overlap of the two edges of the rubberized fabric, the overlapping splice so formed, which is narrow in the circumferential direction, being cut, with the radial threads it contains, by at least one transverse cut in each overlapping edge of the splice, the cut in question being situated underneath the crown of the tire.

For preference, the above cut is of depth greater than half the width of the overlapping splice, these two dimensions being measured in the circumferential direction.

More preferably, the cut is one of the type known as "full", whose depth is greater than the total width of the splice, such that the said splice is crossed entirely from one border to the other by this full cut.

More particularly, the invention concerns a tire whose carcass reinforcement comprises just one radial ply.

DESCRIPTION OF THE DRAWINGS

This invention will be understood easily from the description and the examples presented below, and from the schematic illustrations relating to those examples, which show:

FIGS. 3a and 3b: Another variant of a tire casing according to the invention, with a portion of radial carcass ply having an overlapping splice comprising a plurality of cuts in each of the overlapping edges (FIG. 3b), and the two edges of a single strip of fabric (FIG. 3a) about to be overlapped in order to form this overlapping splice.

DESCRIPTION OF PREFERRED EMBODIMENTS

Figure 1:
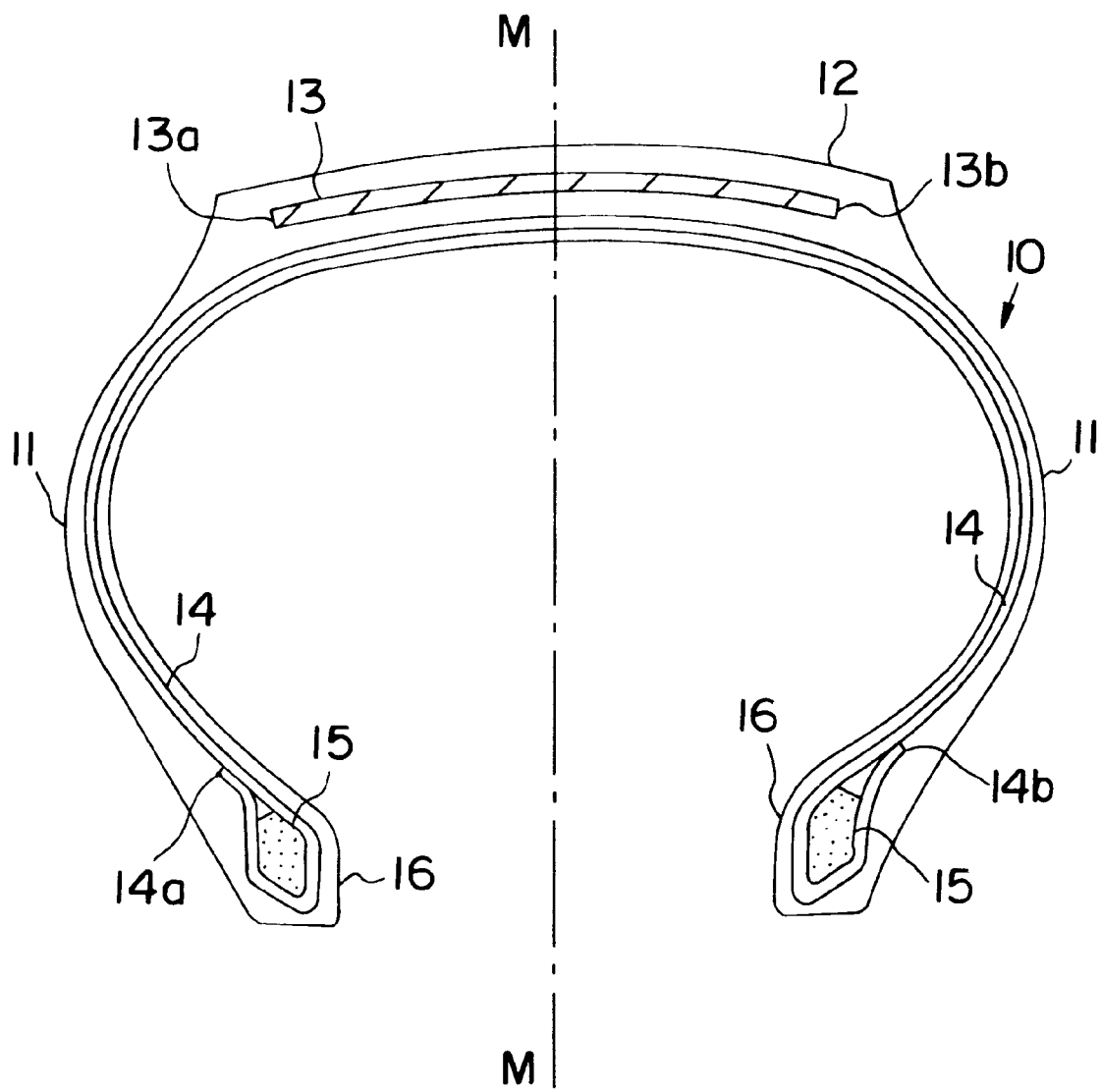
FIG. 1: A radial section of a tire casing with a radial carcass reinforcement.

FIG. 1 is a very general and schematic representation of a radial section of a tire casing with radial carcass reinforcement, the said casing being according to the invention or not in this general representation. The tire 10 comprises two sidewalls 11 connected by a tread 12, a belt reinforcement 13 extending from one edge 13a to the other edge 13b, and a carcass reinforcement 14 anchored to two bead rings 15 in each bead 16 at the two lateral ends 14a and 14b of the reinforcement 14.

The carcass reinforcement 14 consists of at least one radial ply with essentially parallel reinforcement threads extending from one bead to the other in an essentially radial direction, such that they form an angle between 80° and 90° relative to the median circumferential plane M—M. By "median circumferential plane" is understood in a known way the plane perpendicular to the tire's rotation axis and halfway between the two beads 15 and so passes through the middle of the belt reinforcement 13.

Figure 2B:
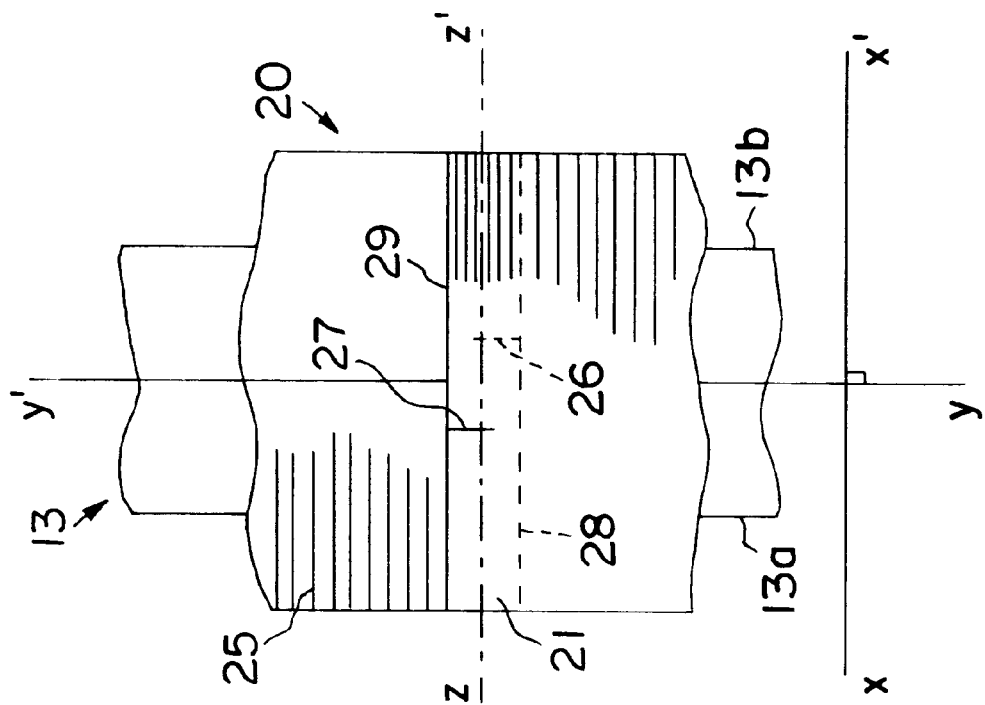
FIGS. 2a and 2b: A tire casing according to the invention, with a portion of radial carcass ply having a splice provided with a cut in each of the overlapping edges (FIG. 2b), and the two edges of a single strip of fabric (FIG. 2a) about to be overlapped in order to obtain this overlapping splice.
Figure 2A:
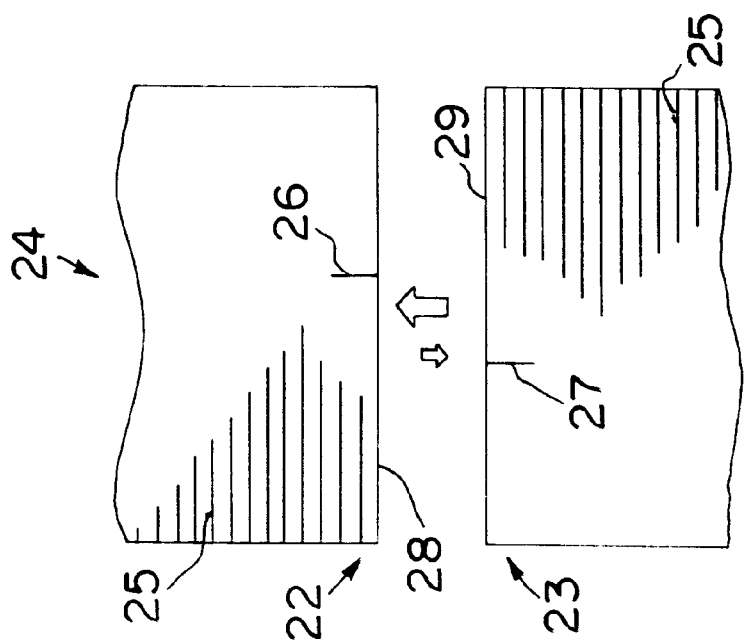

FIG. 2 is a view from below, for a tire casing 10 according to the invention, of part of the radial carcass ply 20 that comprises an overlapping splice 21 (FIG. 2b), and of the two edges or extremities 22 and 23 of a single strip of rubberized fabric (FIG. 2a), the said two edges being about to be overlapped to form the splice 21. The portion of ply 20 constitutes part of the carcass reinforcement 14 whose central area is below the belt reinforcement 13 of the tire 10 according to the invention, the said reinforcement 13 being delimited laterally in FIG. 2b by its two edges 13a and 13b.

To facilitate the description and understanding of the invention, this portion of ply 20 and its overlapping splice 21 are shown schematically in flat projection before the tire has been shaped, and not in the toroidal shape they assume once it has been shaped. The radial ply 20 is reinforced continuously by radial threads 25 arranged at regular intervals and essentially parallel to one another. For the sake of clarity in the figures, it is obvious that these threads have only been shown in part.

As an example, the radial threads may be plied yarns made of polyester fibers, notably of polyethylene terephthalate (PET).

The direction of these radial threads 25 is essentially radial, i.e. essentially parallel to the strictly radial axis (xx'), i.e. their direction makes an angle of 0°±10° relative to the axis (xx') which is itself perpendicular to the circumferential axis (yy') (axis tangential to the circumferential direction). The axis (yy') shown here is the median circumferential axis contained in the median circumferential plane M—M show in FIG. 1, which passes through the middle of the belt reinforcement 13 of the tire, i.e. half-way between its edges 13a and 13b.

When the tire is being fabricated on a drum, before the tire shaping stage, the ply 20 normally consists of an annular element which is continuous in a direction perpendicular to the axis of the radial threads, i.e. essentially parallel to (yy'), this continuous element being formed by overlapping and joining the two edges 22, 23 of a single strip of fabric 24. In each edge 22, 23 just one cut 26, 27 is made, of given depth, extending from each respective border 28, 29 towards the inside of the fabric in a direction essentially perpendicular to the axis of the radial threads 25, the said cut splitting a plurality of these radial threads. This is all shown in FIG. 2a just before the fabric edge 22 is overlapped by the fabric edge 23 to form the continuous ply 20 and its overlapping splice 21 limited by the two borders 28 and 29. In FIG. 2b the border 28 and the cut 26, which are covered by the fabric edge 23, are shown by broken lines.

In general, during the fabrication of the tire according to the invention, each cut is oriented essentially in a circumferential direction, i.e. a direction making an angle of 0°±10° relative to the strictly circumferential direction (yy'). However, the invention can be implemented with larger angles, for example 20° to 30° or even more.

For preference, the cuts are simple incisions, i.e. thin cuts without removal of fabric, but they may also be made as wider cuts involving removal of fabric (the "notching" technique), such as slots or notches of various shapes.

In the overlap zone the density of the radial threads is twice as high as in the remainder of the welded ply. The density of radial threads outside the splice is, in a known way, generally between a few tens and a few hundreds of threads per dm (decimeter), for example between 50 and 250 threads/dm, which corresponds to an interval between two radial threads (axis-to-axis) between a few tenths of a mm (millimeter) and a few mm, for example between 0.4 and 2.0 mm. For example, the radial thread density in the case shown in FIG. 2 is approximately 100 threads/dm of ply outside the splice, and therefore approximately 200 threads/dm of ply within the splice.

In this description the term "overlapping splice" is understood as the entire overlap zone of two adjacent fabric elements forming the radial ply (for example, the two fabric edges 22 and 23 in FIG. 2a), this overlap zone being limited circumferentially by its two borders (for example 28 and 29 in FIG. 2b).

Conventionally, the circumferential dimension of the splice, i.e., the distance along yy' separating the two borders, is called the splice width, and the length of each cut in the same circumferential direction (yy') is called the depth of cut. Whatever the shape or particular orientation of the cut, notably when its axis is inclined relative to the circumferential axis (yy'), the depth of cut is understood not as the length of the cut itself, but as the length of its projection on the circumferential axis (yy').

The two cuts 26 and 27 should preferably have a depth greater than half the splice width, as clearly illustrated in FIG. 2b, since each cut, beginning at each respective border inwards into the splice, extends beyond the median axis (zz') of the splice.

The width of the overlapping splice can vary between a few millimeters and a few tens of millimeters, as a function of the particular characteristics of the tire to be produced. When the tire according to the invention is one for a passenger car or for a van, this width is preferably between 2 mm and 10 mm.

When the overlapping splice has only two cuts under the belt, one in each of the two overlapping edges, it is best for these two cuts to be offset relative to one another, i.e. not superposed. For example, they may be positioned essentially symmetrically on either side of the median circumferential plane, as shown by way of example in FIG. 2b.

According to another embodiment of the invention, the overlapping splice of the radial ply may comprise, under the belt reinforcement, a plurality of cuts in each of the two overlapping edges, as shown for example in FIG. 3.

This FIG. 3 schematically illustrates another example of a tire 10 according to the invention. Seen from below and projected flat, it shows a portion of radial carcass ply 30 with an overlapping splice 31 (FIG. 3b) and the two edges 32 and 33 of a single width of rubberized fabric 34 (FIG. 3a), the said two edges being about to be superposed to form the splice 31. When the tire of the invention is being fabricated, several cuts 36, 37 are made in each edge 32, 33 of the splice, the cuts extending from each respective border 38, 39 by a given depth inwards into the splice in an essentially circumferential direction and splitting several radial threads 25. The entire arrangement is shown in FIG. 3a just before the fabric edge 32 is covered by the fabric edge 33 to form the continuous ply 30 and its overlapping splice 31, the latter limited by its two borders 38 and 39. In FIG. 3b the border 38 and the cuts 36, which are covered at least in part by the fabric edge 33, have been indicated with broken lines.

The cuts 36 and 37 are in this case full cuts whose depth is greater than the splice width. Each of them spans the splice 31 entirely, from one border to beyond the other border.

As shown in FIG. 3, when the overlapping splice of the radial ply has several cuts in each of the two overlapping edges underneath the belt reinforcement, these cuts should preferably be distributed uniformly and in equal numbers along the two overlapping edges, and should be offset relative to each other on the two edges, such that no opposite cuts (i.e. situated on the two opposite edges or borders) are superposed.

As is known, in a classical radial tire according to prior art, each radial thread 25 normally forms a continuous reinforcing are extending along a meridian over the entire width of the tire, and is rolled up in each bead 16 under each of the two bead rings 15, up to the two lateral ends 14a and 14b of the carcass reinforcement 14 (FIG. 1). When at least one full cut is present in each edge of the overlapping splice, under the belt of the tire, as shown for example in FIG. 3b, the continuity of the reinforcement arcs is interrupted over the entire splice width and even beyond it, in each of the two overlapping edges.

In general, in the present description the indicated values of depth of cut, splice width, minimum distance between two cuts, or even thread densities, are values measured in a plane when the radial ply and its overlapping splice are represented as flattened out.

Of course, in all the above figures the actual proportions between the cut sizes, splice widths, dimensions of the tire or its radial ply, those of the radial threads or the spaces between them, and more generally any other parameter, have not been accurately reproduced, in order to simplify the diagrams and clarify the explanation.

Furthermore, the schematic representation of the cuts in the form of simple lines on the figures does not correspond to their real shape in the vulcanized tire, i.e. after the stages of shaping and curing. In fact, the cuts can become more or less deformed during the fabrication of the tire: notably, depending on their number and depth, it is observed that some can gape to a width of several millimeters, essentially in the direction of the radial threads.

The mean distance between two cuts, measured along the principal axis (zz') of the splice, is preferably more than 10 mm, better still above 15 mm, whether the two cuts are opposite or adjacent (i.e. situated on two opposite edges or on the same edge, respectively).

For preference, in the tires according to the invention, the cuts start at the border and extend inwards into the splice as previously shown in FIGS. 2 and 3. However, the invention still applies when the cuts are totally within the splice, i.e. they do not extend up to one and/or the other of the two borders but are located within the overlap zone itself.

The various cuts made in each of the two overlap edges of the splice may have equal or different lengths. Preferably, the cuts are identical in each of the two edges. Thus, the operation of cutting the strips of fabric during the fabrication of the tire is the same for each edge or border of the splice, and can therefore be effected by the same tool at a high rate.

As already mentioned, it is preferable for the splices not to contain any superposed cuts, particularly when one is using for the fabrication of the tire a drum without a membrane. Since the inner liner (airtight rubber) then serves as a membrane, that ply might slip through two superposed cuts that were too widely open during the cover shaping stage, and so pass through the radial ply that is directly over that internal ply.

The same risk exists with a fabrication drum of that type in the case of non-superposed cuts, when the cuts used are few in number and very deep, for example one full incision in each of the two overlapping edges that extends well beyond the borders of the splice. To reduce the opening up of the cuts during fabrication of the tire, it is therefore preferable to reduce the length of the cuts and/or increase their number.

Thus, in general, according to the invention the number and depth of the cuts underneath the tire's belt reinforcement can vary widely, notably as a function of the size of the defect to be corrected, the particular structure of the tire being made, and the fabrication means used.

According to the invention, the overlapping splice of the radial ply preferably comprises in each of its two edges, cuts which are only underneath the belt reinforcement of the tire.

Example Embodiments

Test I:

Two series of tire casings for passenger cars were produced, of size 205/70-15, the first series corresponding to the invention (series A) and the second according to the state of the prior art (series B), each series containing 70 different tires. As shown for example in FIG. 1, the tires of each series had two sidewalls 11 connected by a tread 12, a crown reinforcement 13 extending from one edge 13a to the other edge 13b, and a carcass reinforcement 14 anchored to two bead rings 15 in each bead 16 up to the two lateral ends 14a and 14b of the said reinforcement 14.

In a classical way, the belt reinforcement 13 comprised two superposed plies reinforced by metal cables which were essentially parallel and inclined at about 22° relative to the median circumferential plane, the said plies being crossed relative to the said plane.

The carcass reinforcement 14 consisted of a single radial ply reinforced with radial PET threads (standard PET known as "regular"). These radial threads are plied yarns of formula 110×3 (tex) 275Z275S, i.e. each such plied yarn consists of three yarns (multi-filamentary fibers) whose titer is 110 tex before twisting, twisted individually to 275 turns per meter in the Z direction in a first stage, and the three of them then twisted together in the opposite direction (direction S) to 275 turns per meter during a second stage. The density of radial threads outside the splice was 111 threads/dm of radial ply, and the distance between two adjacent radial threads, axis-to-axis, was then about 0.9 mm. The radial ply comprised an overlapping splice whose axis (zz') was essentially parallel to that of the radial threads. This splice was approximately 6 mm. wide, and so contained 6 to 7 radial threads in each overlapping edge. Its total length along the axis (zz'), from one end 14a to the other end 14b of the radial ply 14, was approximately 550 mm.

During the fabrication of the tires of series A, a single incision was made in each of the borders of the overlapping splice underneath the crown reinforcement, whose depth (about 3.5 mm.) was such that 4 radial threads were cut in each overlapping edge. In total, 8 radial threads were therefore cut underneath the belt reinforcement of the series A tires. The two incisions, starting at each border and extending in a direction essentially perpendicular to the radial threads, were on either side of and essentially an equal distance from the median circumferential plane M—M. The mean distance between the two cuts, measured along the axis (zz') of the splice, was 25 mm.

The presence of these two cuts was the only characteristic that distinguishes the tires of series A from those of series B. In particular, the overlapping splice of their radial ply had no cuts at all outside the zone located underneath the belt reinforcement.

Each casing was fitted to a wheel-rim and inflated to 3.5 bar, and the hollowing due to the overlapping splice was then analyzed by measuring its average depth with a known optical device comprising essentially a laser beam, an optical detector and recording means. The deformation was recorded at a large number of points (several hundred) on each sidewall of the casing, and the mean depth was then calculated for each tire casing tested.

The number of casings was then calculated for which this mean depth was less than 0.500 mm., a threshold below which it is considered that the tire's appearance (sidewall uniformity) is satisfactory. A mean value was also calculated for the depression in each series of tires.

It was found that 99% of the tires in series A (69 out of the 70 tested) responded positively to the test, with a mean depth smaller than 0.500 mm, compared with only 17% of the series B tires.

Besides, for the group of tires in series A, the mean value of the depression was 0.238 mm, while for those in series B it was 0.555 mm, i.e. appreciably more than double.

Test II:

A new series of 20 tires (series C) were produced, all according to the invention. These were made in the same way as those of series A, except for the following two modifications:

the splices were about 4 mm wide and therefore contained 4 to 5 radial threads in each overlapping edge;

the depth of each incision (about 8 mm) was such that 9 radial threads were cut, from each border; each of the two incisions thus extended well beyond the limits of the splice, and in all, 18 radial threads were cut in that way underneath the belt reinforcement.

The tires of series C were checked in the same way as before. It was found that all the tires tested responded positively to the test, i.e. they all had depressions whose mean depth was less than 0.500 mm. The mean value of the depression for the tires of series C was 0.240 mm, with mean depths per casing ranging from 0.100 to 0.430 mm.

Test III:

In this test five new series (series D, E, F, G and H) were produced, each with 20 tires. Series F, G and H were made according to the invention, while series D and E were not.

For this test the procedure was as indicated for tests I and II, except for the following modifications:

- the tires were of size 165/80-13;
- the radial threads were plied yarns of PET known as "HMLS" (high-modulus, low thermal shrinkage PET), of formula 144×2 (tex) 290Z/290S;
- the density of radial threads outside the splice was 116 threads/dm of radial ply;
- the fabrication precision (use of an automatic fabrication machine) was such that the overlapping splice of the radial ply was 6±2 mm wide;
- the inflation pressure of the casings was equal to 4 bar.

These five series of tires differed in the following respects:

- series D (not according to the invention): standard tires with no cuts;
- series F (according to the invention): 1 single cut, depth 2 mm in each of the two overlapping edges;
- series G (according to the invention): 1 single cut, depth 5 mm in each of the two overlapping edges;
- series H (according to the invention): 1 single cut, depth 10 mm in each of the two overlapping edges;
- series E (not according to the invention): 1 single cut, depth 10 mm in only one (the radially outermost) of the two overlapping edges.

For the series according to the invention (F, G and H), the two cuts were made on either side of and an equal distance (about 28 mm) from the median circumferential plane M—M, this distance being measured along the median axis (zz') of the splice. For series E (not according to the invention), the single cut in the radially outermost edge of the overlapping splice was essentially centered underneath the belt reinforcement, i.e. in the median circumferential plane M—M. On the other hand, regardless of the series analyzed (E, F, G or H), the overlapping splice did not comprise any cuts other than that/those under the tire casing crowns.

The hollowing was analyzed as before, by measuring the mean deformation for each tire and calculating a mean depression depth for each series of tires.

The following results were obtained (base 100 for the mean depth calculated on the control series D, with a precision of around 5%):

- series D: 100
- series F: 81
- series G: 78
- series H: 65
- series E: 95

In this test, it should be noted that the control tires of series D (radial ply reinforced with "HMLS" PET) showed low sidewall hollowing, whose calculated mean depth was less than 0.350 mm.

Despite this, it was found that in the tires according to the invention, the sidewall hollowing was reduced by about 20% to 35% compared with the controls, i.e. to a very significant extent, and this even when the depth of the cuts used was limited to 2 mm (series F).

The best results were obtained with full cuts (series H) whose depth (10 mm) w a s greater than the maximum width of the overlapping splice (8 mm). Besides, the use of a single cut on just one of the overlapping edges (series E not according to the invention) was found not to result in a significant improvement, despite a large depth of cut (10 mm) equal to that of series H.

Consequently, thanks to the invention the hollowing is clearly less pronounced in the sidewalls of radial tires, and the t races of the overlapping splices clearly less visible.

Thus, unexpectedly, a defect present in the sidewalls of the tires is corrected by a modification applied under the crown, which is protected by the belt reinforcement and does not, therefore, risk any degradation of the tire's other properties.

It should be noted here that the prior art solutions described herebefore to reduce sidewall hollowing, involved acting on the tension of the radial threads by cutting them in just one edge of the overlapping splice, so as to allow only the threads in the other edge to contribute to the tensioning of the carcass ply.

The cuts according to the invention, in each of the two edges of the overlapping splice, have a different function. By opening up to a greater or lesser extent during the fabrication of the tire casing, essentially in the direction of the radial threads, they allow the splice to deform more than the surrounding fabric and so permit readjustment of the balance of the lengths of the meridians coinciding with the radial threads, between the inside of the overlapping splice and the remainder of the ply, all the way to the sidewall of the inflated tire.

The invention can of course be implemented in cases when the radial threads are not used only to reinforce the radial ply, but are associated with other, non-radial threads. For example, the weft-radial ply may consist of a weft-fabric which, in a known way, comprises warp and weft threads, the warp threads being the radial threads 25 shown in FIGS. 2 and 3, which intersect the weft threads not shown in the figures, for example weft threads made of polyester and/or cotton.

It is also known for the strips of fabric used to fabricate the radial carcass ply to be cut from longer strips of fabric, which themselves comprise splices known as "preparation splices" (in the fabric) by contrast with the "fabrication splices" (in the tire ply).

To fabricate the tires, according to the invention, it is preferable to choose preparation splices which, themselves, in each of their two overlapping edges, comprise at least one cut splitting several radial threads in the central area of the fabric, i.e. in the part of the fabric that will be under the belt reinforcement once the tire has been made. Thus, for preference, when the radial ply contains several overlapping splices, whether these are preparation splices or fabrication splices, each of these overlapping splices has in each of its two edges at least one cut located under the crown reinforcement of the tire, the said cuts splitting several radial threads, and the said cuts preferably being full cuts whose depth is greater than the width of the overlapping splice.

Those skilled in the art will easily perceive the advantages of the invention.

Firstly, the characteristics of the radial threads, their nature and their arrangement are the same both inside and outside the splice, which allows the tire according to the invention to be made using standard, homogeneous fabrics.

Then, to fabricate the tire of the invention, only one modification of minor extent and involving practically no additional cost is applied to the fabrication process and equipment: a cutting operation at the edges of the fabric, namely a simple and rapid operation that can be carried out with blades of classical shape.

Finally and most important, the specific location of the cuts, underneath the belt reinforcement and therefore protected by it, make it safe to produce very deep cuts that split the overlapping edges of the splice and the radial threads it contains, beyond the borders of the splice, without compromising the safety of the tire. This last advantage is an important feature compared with the prior art solutions involving cutting the radial threads in the sidewall or inside part of the tire beads, since such solutions in fact entail, as has already been explained, that none of the threads outside the splice itself should be cut, and therefore that very high precision is demanded when making the cuts and forming the splices.

Thus, fabrication of the tires according to the invention requires no special manual intervention to control or adjust the depths of the cuts, the number of radial threads cut, or even the width of the overlapping splices. Neither does it necessitate the use of machines more accurate than the fabrication machinery used normally to make the classical radial tires. In particular, the tires of the invention can be made with machines operating at a high rate, without loss of productivity.

Needless to say, the invention is not limited to the example embodiments described earlier.

It is not limited to a radial tire with just one radial carcass ply, and applies as well to cases when more than one ply is used to form the carcass reinforcement.

Neither is it limited to the use of radial plies reinforced by threads with low tensile modulus values, such as polyester threads and PET threads in particular. The radial threads can be other textile threads, for example ones based on aromatic or nonaromatic polyamides, cellulose-based fibers, or other non-textile threads, for example metal wires, or even hybrid threads made from different materials.

Besides, the term "thread" should be understood in a very general sense, i.e. each of the radial threads may for example consist of a single unitary thread of cylindrical shape or not, or an assembly of several unitary threads forming, for example, a cable or a plied yarn, a single yarn twisted upon itself, and each unitary thread may indeed consist of a single filament, for example a monofilament of large diameter, or of several filaments. This definition applies regardless of the perpendicular cross-section of the unitary thread, the material, or the assembling technique in the case of assembled filaments.

We claim:

1. A radial tire having at least one belt reinforcement and one carcass reinforcement of at least one ply of rubberized fabric and comprising radial threads, the radial ply having at least one overlapping splice formed by the overlapping of two edges of the fabric and limited circumferentially by two borders, characterized in that each overlapping splice comprises, underneath the belt reinforcement and in each of the overlapping edges, at least one cut which splits a plurality of radial threads.

2. A tire according to claim 1, characterized in that each cut has a depth greater than half the width of the overlapping splice, these dimensions being measured in the circumferential direction.

3. A tire according to claim 2, characterized in that each cut has a depth greater than the width of the overlapping splice.

4. A tire according to claims 1, characterized in that in each edge of the overlapping splice, the cut extends from the edge inwards into the splice.

5. A tire according to claim 1, characterized in that it is a tire for a passenger car or a van, and in that the cuts have a depth in excess of 3 mm.

6. A tire according to claim 1, characterized in that the overlapping splice comprises several cuts, underneath the belt reinforcement and in each of the two edges and distributed in essentially equal numbers in each of the two edges.

7. A tire according to claim 1, characterized in that the overlapping splice has no cuts that are superposed.

8. A tire according to claim 7, characterized in that the mean distance between two cuts, measured along the axis (zz') of the splice, is greater than 10 mm.

9. A tire according to claim 1, whose radial ply contains several overlapping splices, characterized in that each overlapping splice comprises, underneath the belt reinforcement and in each of the overlapping edges, at least one cut splitting a plurality of radial threads.

10. A tire according to claim 9, characterized in that each cut has a depth greater than the width of the overlapping splice.

11. A tire according to claim 1, characterized in that the overlapping splice has all cuts confined to a region underneath the belt reinforcement and no cuts located outside the region underneath the belt reinforcement.

12. A tire according to claim 1, characterized in that the carcass reinforcement comprises a single radial ply.

13. A tire according to claim 1, characterized in that the radial threads are polyester-based.

14. A tire according to claim 13, characterized in that the polyester is polyethylene terephthalate.

* * * * *